(12) United States Patent
Geshwind

(10) Patent No.: US 8,253,729 B1
(45) Date of Patent: Aug. 28, 2012

(54) TRIMMING DEPTH BUFFER DURING 2D TO 3D CONVERSION

(76) Inventor: David M. Geshwind, New York, NY (US)

(*) Notice: Subject to any disclaimer, the term of this patent is extended or adjusted under 35 U.S.C. 154(b) by 331 days.

(21) Appl. No.: 12/151,141

(22) Filed: May 2, 2008

Related U.S. Application Data

(63) Continuation-in-part of application No. 10/615,612, filed on Jul. 8, 2003, now abandoned, which is a continuation of application No. 07/951,267, filed on Sep. 25, 1992, now Pat. No. 6,590,573, which is a continuation-in-part of application No. 07/435,487, filed on Aug. 17, 1989, now abandoned, which is a continuation-in-part of application No. 07/227,403, filed on Dec. 17, 1986, now Pat. No. 4,925,294, and a continuation-in-part of application No. 07/006,291, filed on Jan. 20, 1987, now Pat. No. 5,050,984, which is a continuation of application No. 06/601,091, filed on Apr. 20, 1984, now abandoned, which is a continuation-in-part of application No. 06/492,816, filed on May 9, 1983, now Pat. No. 4,606,625.

(60) Provisional application No. 60/927,202, filed on May 2, 2007.

(51) Int. Cl.
*G06T 15/00* (2011.01)

(52) U.S. Cl. .......... 345/419; 345/522; 345/614; 348/42; 382/284

(58) Field of Classification Search .................. 345/419, 345/506, 522, 614; 348/42; 382/284
See application file for complete search history.

(56) References Cited

U.S. PATENT DOCUMENTS

| | | | |
|---|---|---|---|
| 6,717,576 B1 * | 4/2004 | Duluk et al. ................... | 345/419 |
| 6,798,406 B1 * | 9/2004 | Jones et al. ..................... | 345/419 |
| 7,085,409 B2 * | 8/2006 | Sawhney et al. ............... | 382/154 |
| RE39,342 E * | 10/2006 | Starks et al. ................... | 345/419 |
| 7,167,181 B2 * | 1/2007 | Duluk et al. ................... | 345/506 |
| 7,180,536 B2 * | 2/2007 | Wolowelsky et al. .......... | 348/42 |
| 7,551,770 B2 * | 6/2009 | Harman ......................... | 382/154 |
| 7,557,824 B2 * | 7/2009 | Holliman ........................ | 348/46 |
| 7,573,475 B2 * | 8/2009 | Sullivan et al. ................ | 345/427 |
| 7,573,489 B2 * | 8/2009 | Davidson et al. .............. | 345/646 |
| 7,643,025 B2 * | 1/2010 | Lange ............................. | 345/419 |
| 7,666,096 B2 * | 2/2010 | Novelo .......................... | 463/30 |
| 7,907,793 B1 * | 3/2011 | Sandrew ........................ | 382/284 |

\* cited by examiner

*Primary Examiner* — Phu K Nguyen
(74) *Attorney, Agent, or Firm* — Unipat.org; Anne C. Avellone; David M. Geshwind

(57) ABSTRACT

Techniques for improving the conversion of 2D images to 3D stereoscopic images, including trimming of portions of depth information to achieve improved processing at object boundaries.

41 Claims, 3 Drawing Sheets

+7
0
-7

0

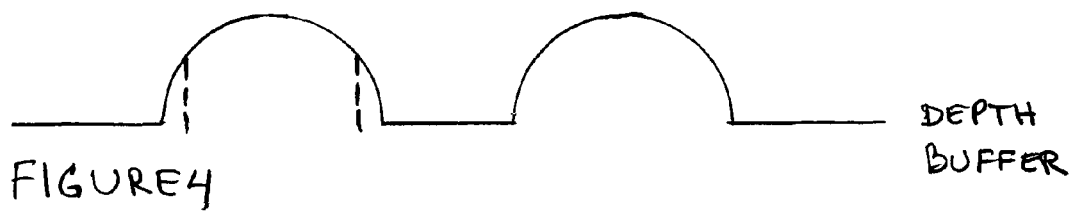
FIGURE 4 — DEPTH BUFFER
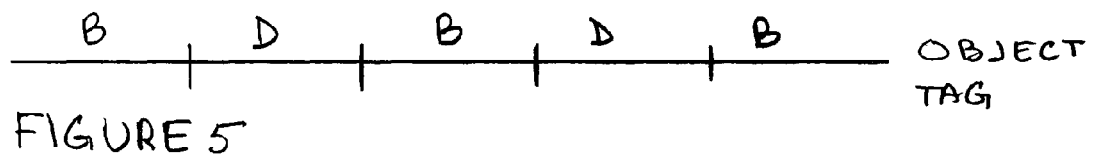
FIGURE 5 — OBJECT TAG
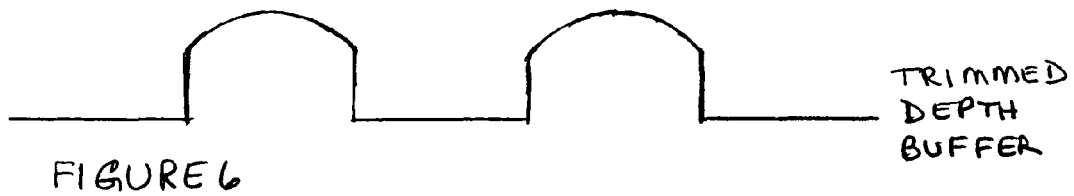
FIGURE 6 — TRIMMED DEPTH BUFFER

TRIMMING DEPTH BUFFER DURING 2D TO 3D CONVERSION

CROSS-REFERENCE TO RELATED APPLICATIONS

This application claims priority from Provisional Application No. 60/927,202 filed May 2, 2007. This application is a continuation-in-part of U.S. patent application Ser. No. 10/615,612 filed Jul. 8, 2003, now abandoned which was a continuation of Ser. No. 07/951,267 filed Sep. 25, 1992, issued Jul. 8, 2003 as U.S. Pat. No. 6,590,573. That application was a continuation-in-part of Ser. No. 07/435,487 filed Aug. 17, 1989, now abandoned which was a continuation-in-part of Ser. No. 07/227,403 filed Dec. 17, 1986, now issued as U.S. Pat. No. 4,925,294 and also of Ser. No. 07/006,291 filed Jan. 20, 1987, now issued as U.S. Pat. No. 5,050,984 which was a continuation of Ser. No. 06/601,091 filed Apr. 20, 1984, now abandoned which was a continuation-in-part of Ser. No. 06/492,816 filed May 9, 1983, now issued as U.S. Pat. No. 4,606,625. All of these Patents and Applications are hereby incorporated by reference in their entirety.

COPYRIGHT NOTICE

The entire specification copyright 2006-2008 to applicant. The copyright owner has no objection to the facsimile reproduction by anyone of the patent document or the patent disclosure, as it appears in the Patent and Trademark Office patent file or records, but otherwise reserves all copyright rights whatsoever. In particular, the graphics, designs and text herein, in addition to any patent rights, are also covered by copyright and/or trademark. Permission to copy those materials is solely limited to their use in conjunction with the lawful distribution of this patent document and all other rights, including their publication, are reserved.

BACKGROUND OF THE INVENTION

1. Field of the Invention

This invention relates to methods for converting 2D images to stereoscopic 3D images and to the modification of stereoscopic 3D images.

2. Description of Related Art and Scope of Invention

See the comparable sections of applicant Geshwind's prior issued patents (in particular, U.S. Pat. No. 6,590,573 and U.S. Pat. No. 6,661,463) for a discussion of relevant related art.

Practitioners of the instant invention are computer scientists, engineers and/or filmmakers with a high degree of technical training and are fully familiar with methods and systems that perform: image capture (film and video cameras and recording devices); image digitization; image processing (by both digital and film methods); digital image synthesis and computer graphics; image compositing; image output, display and recording; etc. In particular, these include digital image processing systems of high performance and high resolution employing digital signal processing hardware and frame stores, stereoscopic cameras of all (and, in particular large-screen) formats, stereoscopic 3D image rendering and 2D to stereoscopic 3D image conversion (hereinafter "2D to 3D conversion").

The intended practitioner of the present invention is someone who is skilled in designing, implementing, building, integrating and operating systems to perform these functions; and, in particular, is capable of taking such systems and integrating new image processing algorithms into the operation of an otherwise extant system.

Many of the technical elements disclosed herein are standard and well known methods or devices. The details of building and operating such standard systems, and accomplishing such standard tasks, are well known and within the ken of those skilled in those arts; are not (in and of themselves, except where noted) within the scope of the instant invention; and, if mentioned at all, will be referred to but not described in detail in the instant disclosure.

Rather, what will be disclosed are novel techniques, algorithms and systems, and novel combinations thereof, optionally also incorporating extant techniques, algorithms and systems. The results are novel single or composite techniques, algorithms and systems and/or novel purposes to which they are applied and/or novel results thereby achieved.

In summary, the disclosure of the instant invention will focus on what is new and novel and will not repeat the details of what is known in the art.

BRIEF DESCRIPTION OF THE DRAWINGS

FIG. 4 depicts the values stored in one line (the dashed line of FIG. 1) of a depth buffer, where the forwardmost surface (in this case among the models of FIGS. 2 and 3) obscures those behind it for each pixel.

FIG. 5 depicts the same data line in an object tag buffer where sections labeled 'B' correspond to the background (FIG. 3) and sections labeled 'D' correspond to the doughnut (FIG. 2). The object tag information corresponds essentially to which objects are present in the pixels of the original image.

FIG. 6 depicts a trimmed depth buffer gives a more accurate assignment of depth to object, particularly at boundaries.

AN ALTERNATIVE PREFERRED EMBODIMENT

When converting 2D images, motion picture or television signals for 3D systems and display, a second (or two) view is created to supplement the original single-perspective view.

In order to accomplish this images are segmented into objects, often by a combination of human outlining and computer image processing; depth information for the objects is surmised, computationally reconstructed or otherwise specified (again, often with human design and/or input), and often resides in a pixel oriented depth buffer during some part of the processing; and, from these (and, optionally other) information one or two new images are created by shifting, warping, or otherwise distorting the image portions within the segmented objects according to parallax rules and the depth information associated with the object.

Particularly where motion picture segments are involved, the depth information is created by modeling 3D shapes, as with a computer animation program, to correspond to the objects and recreating the position, orientation and motion of these objects, as well as the camera. Intermediate results (often a depth buffer or similar representation) are captured from the animation program and used to distort the image to create the other view(s) according to the rules of parallax.

It is often the practice to model the 3D objects as slightly outsized versions of the original objects to compensate for inaccuracies and inadequacies in the process. Consequently, the depth buffer representing the depth of the composite scene with intersecting objects is inaccurate. The following process will compensate for some of these inaccuracies.

The following discussion and the accompanying Figures are simplified and exaggerated for illustrative purposes.

Figure 1:
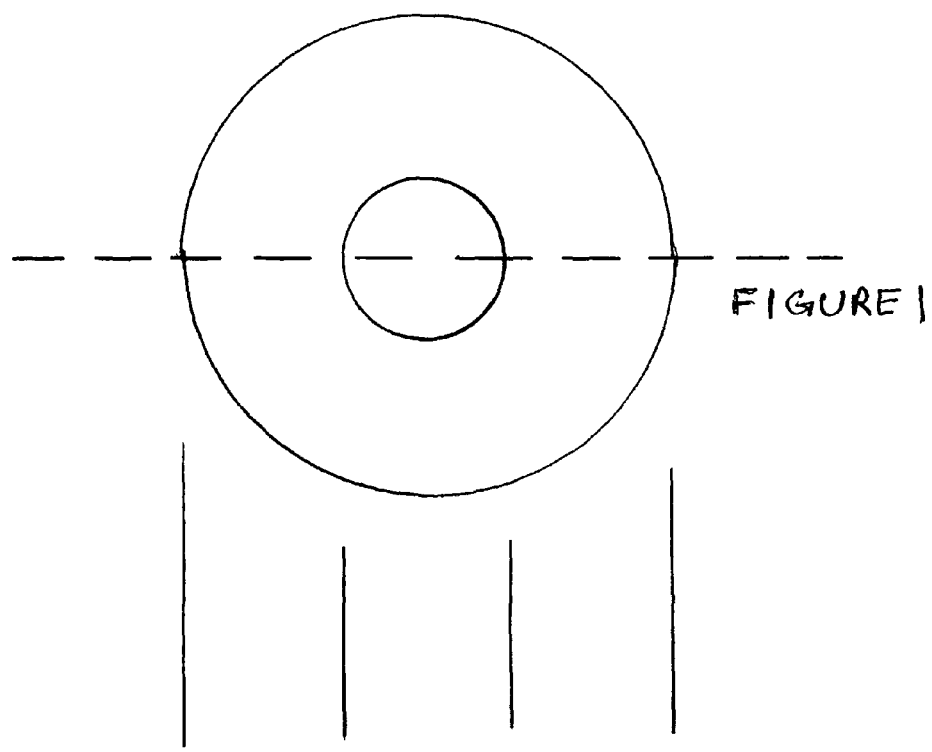
FIG. 1 depicts circles comprising the outer and inner circles bounding a torus A dashed line bisects the doughnut along the X-Z plane.

Consider FIG. 1, showing a doughnut shaped object against a background that is at the plane of the screen; that is the doughnut protrudes from the screen exactly half way, cut parallel to the circumference of the circles comprising the outer and inner circles bounding the torus. A dashed line bisects the doughnut along the X-Z plane.

Figure 2:
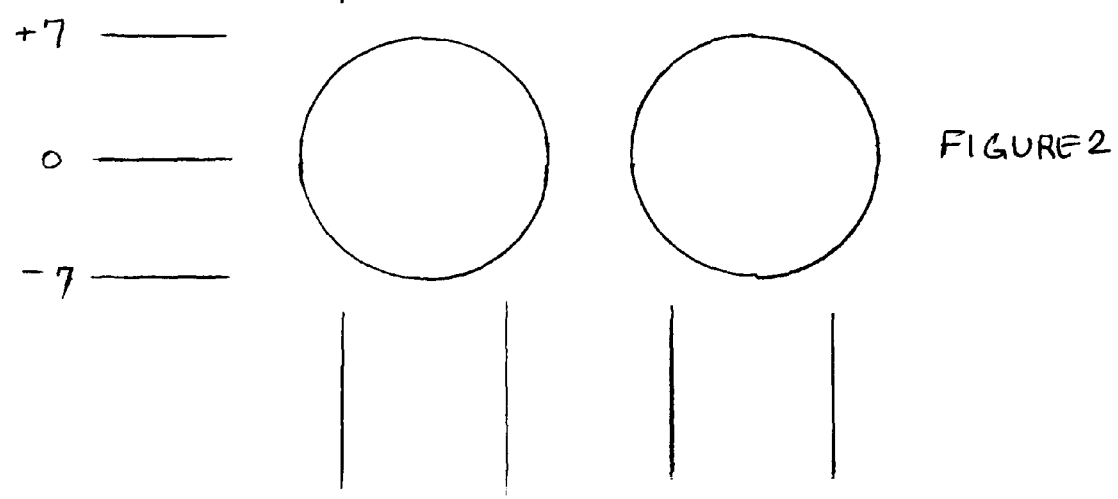
FIG. 2 depicts the cross-section through the dashed line of FIG. 1 and the depth model buffer that results.

FIG. 2 depicts the cross-section through the dashed line of FIG. 1 and the depth model buffer that results. Note that the doughnut shaped model is larger (causing the inner hole to shrink) than the original, as can be seen by the guide lines dropped from FIG. 1, and the fact that although the radius of the 3D circular annulus is 5 units, the cross-section has a radius of 7 (the depth running from +7 to −7 around a depth of 0 at the screen).

Figure 3:
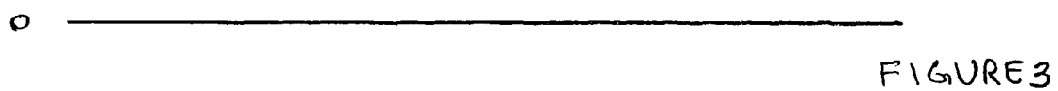
FIG. 3 depicts the depth model of the background plane of the screen, at a depth of 0.

FIG. 3 depicts the depth model of the background plane of the screen, at a depth of 0.

FIG. 4 depicts the values stored in one line (the dashed line of FIG. 1) of a depth buffer, where the forward most surface (in this case among the models of FIGS. 2 and 3) obscures those behind it for each pixel. Note that (shown only for the left portion of the doughnut) there are two sections comprising portions of the outsized 3D model (the two roughly shark-fin-shaped portions distal of the dashed lines) which exceed the bounds of the original object. Also note that separate depth buffers are, alternately, developed from each of the two models in FIGS. 2 and 3 and are then combined (taking the closest value of the two for each pixel, with undefined pixels in FIG. 2 having a value equivalent to negative infinity, or maximum or furthest depth) to arrive at the depth buffer as in FIG. 4.

FIG. 5 depicts the same data line in an object tag buffer where sections labeled 'B' correspond to the background (FIG. 3) and sections labeled 'D' correspond to the doughnut (FIG. 2). The object tag information corresponds essentially to which objects are present in the pixels of the original image.

If the object tag information is used to 'trim' the model of the doughnut, forcing the background where 'B' values are located, and choosing the closest value where 'D' values are located, then the trimmed depth buffer, as depicted in FIG. 6, is achieved which gives (in some ways) a more accurate assignment of depth to object, particularly at boundaries. Thus, one type of inaccuracy is thus corrected for.

Figure 7:
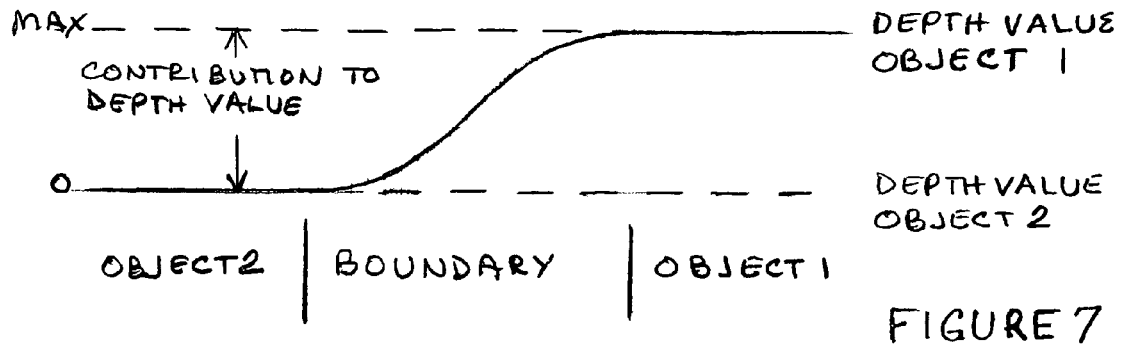
FIG. 7 depicts how for some portions of boundaries between objects where the depth modeling information is determined to be incorrect, or is ambiguous, the depth information across the boundary (or across a zone spanning the boundary) is interpolated between two depths, typically the depths from the two models associated with the two objects abutting at the boundary.

FIG. 7 depicts how for some portions of boundaries between objects where the depth modeling information is determined to be incorrect, or is ambiguous, the depth information across the boundary (or across a zone spanning the boundary) is interpolated between two depths, typically the depths from the two models associated with the two objects abutting at the boundary. The depth is interpolated such that when further from the boundary, where the confidence is greater that the depth of one object or the other is correct, the depth is proportionally greater for that object's (or its associated depth model's) depth. It the center of the boundary zone, where confidence is minimum, interpolative mixing is greatest.

Figure 8:
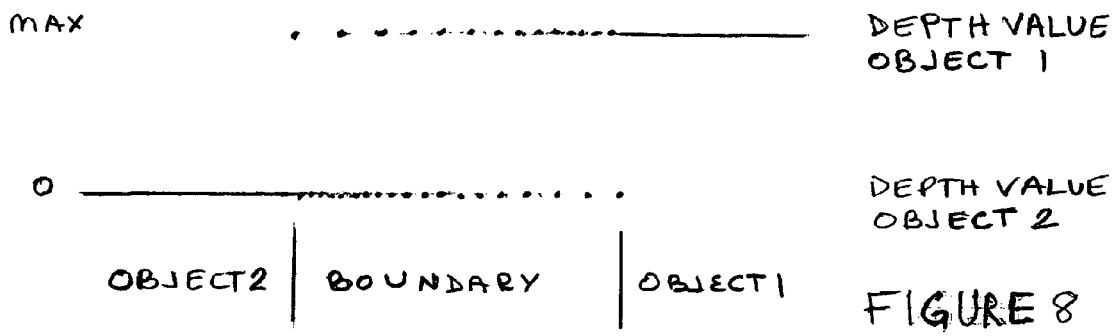
FIG. 8 depicts how depth dithering (a form of randomness or noise) is used for some portions of boundaries between objects.
Figure 9:
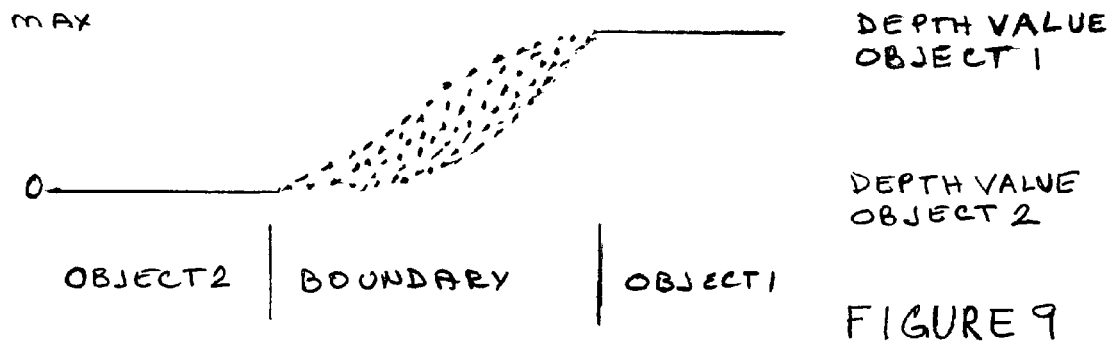
FIG. 9 depicts how depth dithering (a form of randomness or noise) is used for some portions of boundaries between objects where dithering is done around an interpolated value combining the techniques.

FIGS. 8 and 9 depict another approach for the same situation. Here, rather than computational (generally continuous) interpolation, depth dithering (a form of randomness or noise) is used. Two situations are depicted where dithering is done by frequency (FIG. 8) and where dithering is done around an interpolated value (FIG. 9) combining the techniques.

Intellectual Property

As previously stated it should be understood that the various examples for data schemes and algorithms are exemplary and not intended to be limiting in nature. In practice, especially as computer power and storage space increase, these examples are to be considered as teaching examples of processes that are, optionally, practiced at higher resolution, in any domain, a higher degree of automation, or utilizing in substitution different extant or later developed technologies to affect substantively equivalent functions or elements of the instant invention.

The designs, systems, algorithms, program flows, layouts, organizations, functions and/or business relationships described and depicted herein are exemplary. Some steps or elements may be ordered or structured differently, combined in a single step or element, broken apart into multiple steps or elements, skipped or eliminated entirely, or accomplished in a different manner. However, the steps, elements and embodiments depicted and described herein do work. Substitution of equivalent techniques or technologies, or combination with other techniques or technologies, now in existence or later developed, are within the scope of the instant invention. Examples, without limitation, include: analog, video, film and digital technologies; functional operation implemented in special purpose hardware and general purpose hardware running control software; film, magnetic and optical recording; computer and television display; various image processing, information recognition, artificial and other computing algorithms; etc.

Except as specifically disclosed, the details of: well-known engineering, implementation and construction of systems; programming and specific operation of computing algorithms; file and information formats; delivery or distribution of information; and, the implementation of the operation, and human interface, of functions; described herein are, generally, not, in and of themselves, the substance of the instant invention. Rather this specification focuses on what is new and useful about the instant invention. Substitutions of, variations on, and combinations with, other processes, technologies, algorithms, designs and elements, now in use or later developed, is considered to be within the scope of the invention.

The contents of the disclosure of this patent document, any attached computer program code, and the accompanying figures, is copyright to the inventor. The copyright owner has no objection to the facsimile reproduction of the patent document or the patent disclosure, as it appears as issued by the Patent and Trademark Office, to the extent permitted by law. Written permission of the copyright holder must be obtained for any other use. Copyright holder otherwise reserves all copyright rights whatsoever, including the right to excerpt, compile or otherwise alter or adapt, or make any other use of, this information.

Further, any names or other identifying phrases or slogans used herein, and any other trademarkable elements are trademarked to the inventor.

In any event, any publication of or about any of the information contained herein must contain appropriate patent, trademark and copyright notices.

It will thus be seen that the objects set forth above, among those made apparent from the preceding description, are efficiently attained and certain changes may be made in carrying out the above method and in the construction set forth. Accordingly, it is intended that all matter contained in the above description or shown in the accompanying figures shall be interpreted as illustrative and not in a limiting sense.

Now that the invention has been described, what is claimed as new and desired to be secured by Letters Patent is:

1. An improved process employing at least in part a digital computer system for converting a 2D motion picture sequence into a 3D stereoscopic motion picture sequence; said process comprising at least in part the creation of 3D depth information and for at least some 2D image frames of said 2D motion picture sequence for a particular 2D image frame the creation of at least one processed 2D image frame by geometrically distorting at least some visual information of said particular 2D image frame in accordance with said 3D depth information; such that two or more of said 2D image frames associated with said particular 2D image frame, when appropriately displayed to a viewer, are suitable to create the perception of a 3D stereoscopic image frame of said 3D motion picture sequence; wherein said improvement comprises:
   a. developing at least one 3D model information, in addition to an optional default 3D model information, in association with at least some portion of at least one object depicted in said 2D motion picture sequence, at least one of said at least one 3D model information being inaccurate as applied to at least one of said 2D image frames;
   b. for at least some frames in said 2D motion picture sequence, developing at least one object tag information, in addition to an optional default object tag information, in association with at least some portion of at least one object depicted in said 2D motion picture sequence;
   c. developing at least one association between said at least one 3D model information and said at least one object tag information; and,
   d. utilizing said 3D depth information to create at least some particular 2D processed image frames; further comprising at least in part that, for each of said at least some particular processed 2D image frames, for at least one particular portion of the corresponding 2D image frame, 3D depth information is selected to be utilized not from the comparable portion of the comparable 3D model information that is closest to the computational viewer position in depth space, but from the comparable portion of a distinct 3D model information that is associated with the object tag information associated with the particular one of each of said at least one particular portion of the 2D image frame corresponding to the particular one of said at least some 2D processed image frames.

2. The process of claim 1, comprising in addition that for at least one area of a processed 2D image frame comprising a portion of a neighborhood of a boundary between two objects each of which is associated in the neighborhood of said boundary with a distinct 3D model information where 3D depth information is uncertain the 3D depth information across the boundary is interpolated between depth information derived from the two 3D model informations associated with said two objects.

3. The process of claim 2, wherein for said interpolation the ratio between the two depth values associated with said two models at any given location is controlled by the relative levels of confidence that each model is the correct model.

4. A product comprising a 3D image information sequence created at least in part by the process of claim 3, and conveyed via a tangible information bearing medium.

5. A product comprising a 3D image information sequence created at least in part by the process of claim 2, and conveyed on a tangible information bearing medium.

6. A product comprising an exhibition of a 3D image sequence created at least in part by the process of claim 2 and conveyed on a tangible information bearing medium.

7. A process of conveying via a tangible information bearing medium a 3D image information sequence created at least in part by the process of claim 2.

8. The process of claim 1, comprising in addition that for at least one area of a processed 2D image frame comprising a portion of a neighborhood of a boundary between two objects each of which is associated in the neighborhood of said boundary with a distinct 3D model information where 3D depth information is uncertain the 3D depth information across the boundary is modulated between depth information derived from the two 3D model informations associated with said two objects by a process substantially similar to dithering.

9. The process of claim 1, comprising in addition that for at least some portions one area of a processed 2D image frame comprising a portion of a neighborhood of a boundary between two objects where 3D depth information is uncertain the image information in said particular 2D image is blurred or digitally filtered.

10. The process of claim 9, comprising in addition that said blurring or digital filtering is accomplished at least in part by an interactive graphic system.

11. A product comprising a 3D image information sequence created at least in part by the process of claim 5, and conveyed on a tangible information bearing medium.

12. A product comprising an exhibition of a 3D image sequence created at least in part by the process of claim 9 and conveyed on a tangible information bearing medium.

13. A process of conveying via a tangible information bearing medium a 3D image information sequence created at least in part by the process of claim 9.

14. The process of claim 1, comprising in addition that said object tag information is developed at least in part utilizing a computer-assisted interactive outlining system.

15. The process of claim 14, comprising in addition that shape interpolation is employed with said computer-assisted interactive outlining system to create said object tag information.

16. A product comprising a 3D image information sequence created at least in part by the process of claim 14, and conveyed on a tangible information bearing medium.

17. A product comprising an exhibition of a 3D image sequence created at least in part by the process of claim 14 and conveyed on a tangible information bearing medium.

18. A process of conveying via a tangible information bearing medium a 3D image information sequence created at least in part by the process of claim 14.

19. The process of claim 1, comprising in addition that said object tag information is developed at least in part utilizing a computer automated edge detection system.

20. The process of claim 1, comprising in addition that said object tag information is developed at least in part utilizing information from a computer animation system.

21. The process of claim 1, comprising in addition that said at least some of at least one 3D model information is derived at least in part from a computer-assisted interactive 3D modeling system.

22. The process of claim 21, comprising in addition that geometric-temporal interpolation is employed with said computer-assisted interactive 3D modeling system to create said 3D model information.

23. The process of claim 1, comprising in addition that at least some of said at least one 3D model information is derived at least in part from computer analysis of said 2D image sequence.

24. The process of claim 1, comprising in addition that at least some of said at least one 3D model information is derived at least in part from computer analysis of at least one 3D image pair.

25. The process of claim 1, comprising in addition that at least some of said at least one 3D model information is derived at least in part utilizing information from a computer animation system.

26. A product comprising a 3D image information sequence created at least in part by the process of claim 1, and conveyed on a tangible information bearing medium.

27. A product comprising an exhibition of a 3D image sequence created at least in part by the process of claim 1 and conveyed on a tangible information bearing medium.

28. The process of claim 1, wherein said at least one 3D model information of step a. is a multiplicity.

29. The process of claim 1, wherein said at least one object tag information of step b. is a multiplicity.

30. The process of claim 1, wherein said at least one particular portion of the corresponding 2D image frame of step d. is a multiplicity.

31. The process of claim 1, comprising in addition that, for at least one processed 2D image frame a gap results from said geometric distortion and is filled with information derived other than from the corresponding 2D image frame.

32. A product comprising a 3D image information sequence created at least in part by the process of claim 31, and conveyed via a tangible information bearing medium.

33. A process of conveying via a tangible information bearing medium a 3D image information sequence created at least in part by the process of claim 1.

34. An improved process employing at least in part a digital computer system for converting a 2D source image into a 3D stereoscopic image; said process comprising at least in part the creation of 3D depth information and for said 2D source image the creation of at least one processed 2D image by geometrically distorting at least some visual information of said 2D source image in accordance with said 3D depth information; such that two or more of said 2D images associated with said 2D source image, when appropriately displayed to a viewer, are suitable to create the perception of a 3D stereoscopic image; wherein said improvement comprises:
   a. developing at least one 3D model information, in addition to an optional default 3D model information, in association with at least some portion of at least one object depicted in said 2D image, at least one of said at least one 3D model information being inaccurate as applied to said 2D image;
   b. for said 2D image, developing at least one object tag information, in addition to an optional default object tag information, in association with at least some portion of at least one object depicted in said 2D image;
   c. developing at least one association between said least one 3D model information and said at least one object tag information; and,
   d. utilizing said 3D depth information to create at said at least one 2D processed image; further comprising at least in part that, for at least one of said at least one processed 2D image, for at least one particular portion of said 2D image, 3D depth information is selected to be utilized not from the comparable portion of the comparable 3D model information that is closest to the computational viewer position in depth space, but from the comparable portion of a distinct 3D model information that is associated with the object tag information associated with the particular one of each of said at least one particular portion of said 2D image.

35. The process of claim 34, applied to a sequence of 2D source images to create a sequence of 3D stereoscopic images.

36. The process of claim 35, wherein at least one of said 3D models is utilized in association with more than one of the 2D source images comprising said sequence of 2D source images.

37. The process of claim 35, wherein at least one of said 3D models is utilized in association with more than one processed 2D image associated with a particular one of the 2D source images comprising said sequence of 2D source images.

38. A product comprising a 3D image information sequence created at least in part by the process of claim 35, and conveyed via a tangible information bearing medium.

39. An improved process employing at least in part a digital computer system for converting a 2D source image into a 3D stereoscopic image; said process comprising at least in part the creation of 3D depth information and for said 2D source image the creation of at least one processed 2D image by geometrically distorting at least some visual information of said 2D source image in accordance with said 3D depth information; such that two or more of said 2D images associated with said 2D source image, when appropriately displayed to a viewer, are suitable to create the perception of a 3D stereoscopic image; wherein said improvement comprises:
   a. developing at least one 3D model information, in addition to an optional default 3D model information, in association with at least some portion of at least one object depicted in said 2D image, at least one of said at least one 3D model information being inaccurate as applied to said 2D image;
   b. for said 2D image, developing at least one object tag information, in addition to an optional default object tag information, in association with at least some portion of at least one object depicted in said 2D image;
   c. developing at least one association between said least one 3D model information and said at least one object tag information; and,
   d. utilizing said 3D depth information to create at least one 2D processed image; further comprising at least in part that said 3D depth information is collected into a data structure substantially similar to a depth buffer by combining at least some depth information derived from said at least one 3D model information and that at least some of the depth information derived from at least one particular one of said at least one 3D model information is trimmed by application of the object tag information associated with said particular trimmed 3D model information for each particular 3D model information which is trimmed.

40. The process of claim 39, applied to a sequence of 2D source images to create a sequence of 3D stereoscopic images.

41. A product comprising a 3D image information sequence created at least in part by the process of claim 40, and conveyed via a tangible information bearing medium.

* * * * *